United States Patent [19]
Amorai-Moriya et al.

[11] Patent Number: 6,141,293
[45] Date of Patent: Oct. 31, 2000

[54] ULTRASONIC POSITIONING AND TRACKING SYSTEM

[75] Inventors: Netzer Amorai-Moriya, Ramat Hasharon; Mordechai Itzkovitch, Petach Tikva, both of Israel

[73] Assignee: Netmor Ltd., Bnei Berak, Israel

[21] Appl. No.: 09/181,800

[22] Filed: Oct. 29, 1998

[30] Foreign Application Priority Data

Oct. 30, 1997 [IL] Israel ........................................ 122079

[51] Int. Cl.$^7$ ........................................ G01S 3/80
[52] U.S. Cl. .......................... 367/127; 367/129; 367/907
[58] Field of Search .................................. 367/118, 127, 367/124, 125, 6, 129, 907

[56] References Cited

U.S. PATENT DOCUMENTS

| | | |
|---|---|---|
| 3,731,273 | 5/1973 | Hunt . |
| 4,333,170 | 6/1982 | Mathews et al. . |
| 4,391,137 | 7/1983 | Kerfoot et al. . |
| 4,459,853 | 7/1984 | Miwa et al. . |
| 4,751,689 | 6/1988 | Kobayashi . |
| 4,807,202 | 2/1989 | Cherri et al. . |
| 4,862,152 | 8/1989 | Milner . |
| 5,107,746 | 4/1992 | Bauer . |
| 5,142,506 | 8/1992 | Edwards . |
| 5,214,615 | 5/1993 | Bauer . |
| 5,339,259 | 8/1994 | Puma et al. . |
| 5,412,619 | 5/1995 | Bauer . |
| 5,495,427 | 2/1996 | Puma et al. . |
| 5,528,232 | 6/1996 | Verma et al. . |

*Primary Examiner*—Daniel T. Pihulic
*Attorney, Agent, or Firm*—Banner & Witcoff, Ltd.

[57] ABSTRACT

A method of tracking an object within a surveillance area having a predetermined linear extent. One or more ultrasound transducers are fixed to the object. A plurality of background units are placed at known positions in the area, each unit including an ultrasound transducer. One or more ultrasound waves are transmitted between the object and the plurality of background units. The ultrasound waves are received if they have propagated between the object and the background units within a time window of a duration such that the product of the duration and the speed of sound is substantially less than the linear extent of the detection area. A characteristic of the received ultrasound waves is determined, and coordinates of the object are determined responsive to the characteristic.

51 Claims, 7 Drawing Sheets

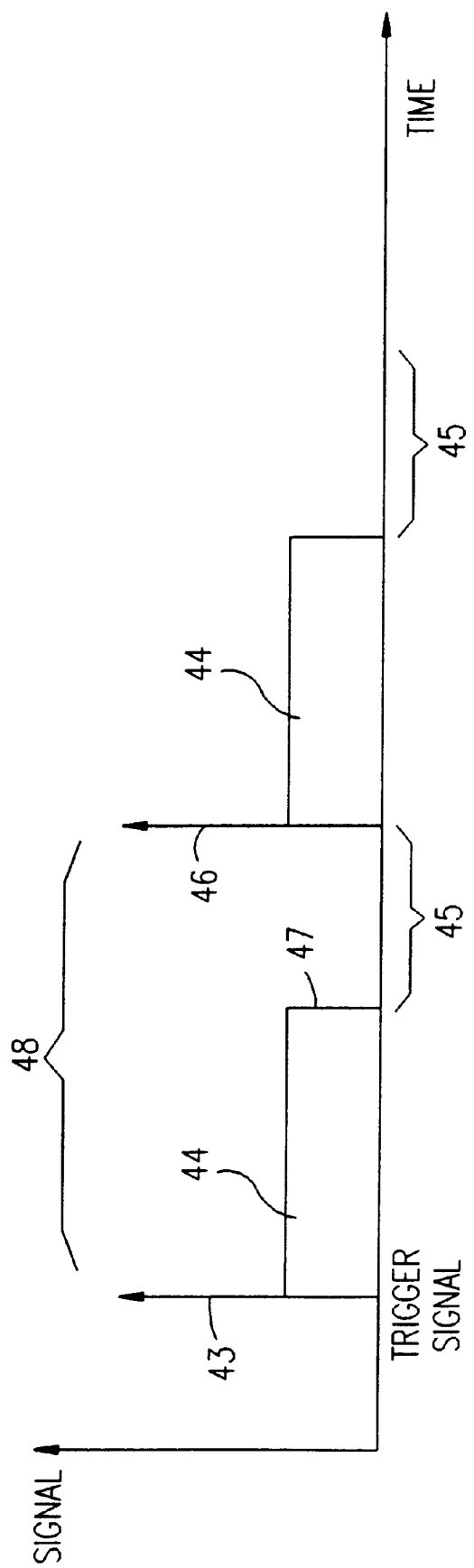

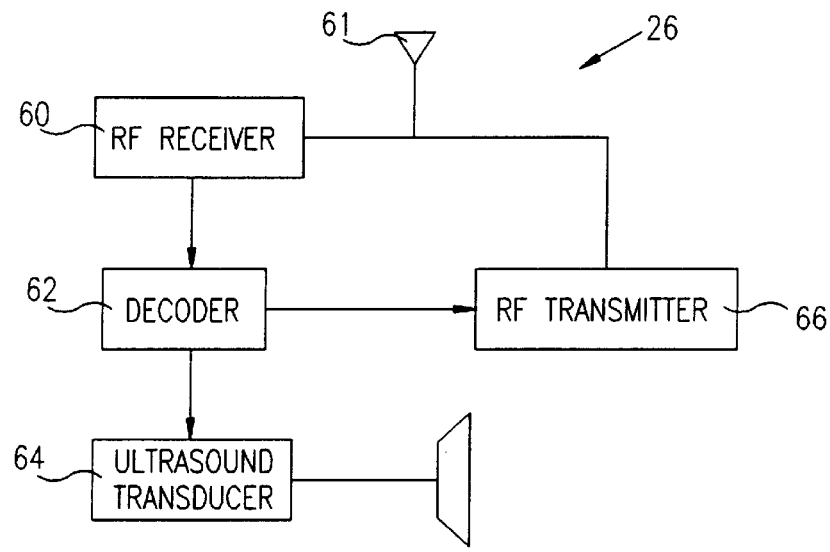
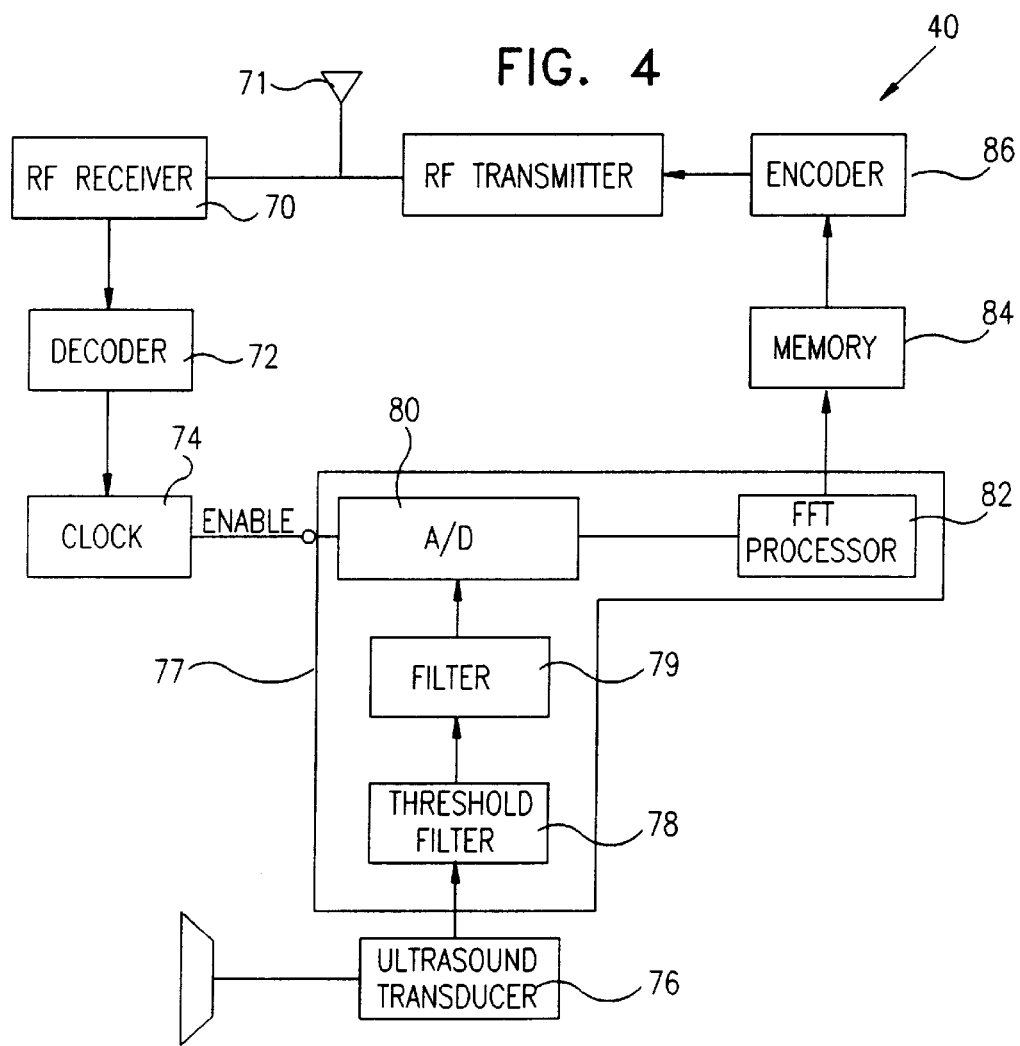

ULTRASONIC POSITIONING AND TRACKING SYSTEM

FIELD OF THE INVENTION

The present invention relates generally to tracking systems, and specifically to long range ultrasonic position tracking systems.

BACKGROUND OF THE INVENTION

The use of ultrasound waves for distance measurement is well known in the art. Basically, an ultrasonic wave is transmitted from a fixed unit, to a sensor associated with an object to which the distance is to be measured. Alternatively, the wave may be transmitted from the object and received at the fixed unit. The propagation time of the ultrasonic wave is used to determine the distance between the fixed unit and the object, according to the known sound velocity in the object's environment. Such a system is described, for example, in U.S. Pat. No. 4,751,689 which is incorporated herein by reference. In the 4,751,689 patent, radio frequency waves are used to communicate between the fixed unit and the sensor in order to simultaneously initiate the propagation-time measurement with the wave transmission.

Such distance measurement is further used for position determination. Generally, three fixed units at known fixed points determine simultaneously, or within a short interval, the distance to the object. The position of the object in three dimensions is determined accordingly. Such systems are described for example in U.S. Pat. Nos. 3,731,273, 4,862,152 and 5,142,506, which are incorporated herein by reference. In order to continuously track an object, multiple position determining cycles are performed consecutively. The rate at which the cycles are repeated is called the refresh rate and is generally desired to be as high as possible in order to provide quasi-continuous tracking.

In order to track both position and orientation of an object, such as a helmet, it is desirable to attach at least three sensors to the object. U.S. Pat. No. 4,807,202 describes a visual environment simulator which tracks the spatial coordinates and orientation of a viewer. Three transmitters associated with the viewer send intermittent signals to three receivers in order to provide the information for tracking.

One of the problems with ultrasound tracking is the slow propagation velocity of ultrasound waves and therefore the low refresh rate. In the simulator of the 4,807,202 patent, the refresh rate is even lower because of the need to transmit consecutively three ultrasonic waves, in every cycle. In addition, the positions of all three transmitters are not determined simultaneously.

U.S. Pat. Nos. 5,339,259 and 5,495,427, which are incorporated herein by reference, enhance the refresh rate of tracking systems by measuring the distance between the sensors and fixed units based on a phase shift of transmitted ultrasonic waves, rather than according to propagation time. The 5,339,259 patent suggests using a plurality of distinct frequencies in order to allow simultaneous measurement of nine distances. The systems of the 5,339,259 and 5,495,427 patents are oriented to tracking position and orientation of only one object, which has a wire connection to the tracking system. The system of the 5,495,427 patent is not capable of tracking more than one object, since it determines the distance of the object from the fixed unit based on only one sensor. The positions of the other sensors are determined relative to this sensor. The 5,339,259 patent requires an additional complete tracking system for each further object to be tracked, since the tracking system is specifically planned for tracking one object.

Another tracking system is described in U.S. Pat. No. 5,412,619, which is incorporated herein by reference. In this system the refresh rate is enhanced by consecutively transmitting waves of a plurality of different frequencies toward the tracked object. Thus, it is possible to transmit another wave before the previous wave has arrived at the target. The 5,412,619 patent also suggests using an extra, fourth, fixed unit to overcome momentary obstructions in the path of the ultrasound waves, and provide extra data for discovering obvious errors.

The above-mentioned tracking systems have a limited area in which the objects may be tracked. In most of these systems, the refresh rate is dependent on the diameter of the area in which the object is tracked. The larger the area, the lower the refresh rate, since the waves need to propagate longer distances. In order to prevent tracking errors, it is generally not possible to transmit another wave of the same frequency before a previous wave has propagated the full length of the tracked area.

U.S. Pat. No. 4,333,170, which is incorporated herein by reference, describes a passive ultrasonic detection system which detects the direction to an ultrasound emitting object. The system uses a plurality of receivers to determine the direction to the object. The system identifies from which object each receiver received signals according to the frequency of the received signals. However, this system does not provide the distance to the object or the object's orientation, and since it has no indication of the time of transmission of the signals could not determine the distance in any known manner.

U.S. Pat. No. 5,528,232 describes a communication system which is used for locating objects within a warehouse. A travel distance, defined as the distance between a locator and the object along unobstructed paths, is determined according to the propagation time of an ultrasonic wave. The 5,528,232 patent suggests achieving greater location precision by using a greater number of locators. This system is slow and cannot determine simultaneously the positions of more than one object. Also, this system does not provide true position information, but rather unobstructed-path information, and therefore is not suitable for high refresh-rate position and orientation tracking.

SUMMARY OF THE INVENTION

It is an object of some aspects of the present invention to provide apparatus and methods for high refresh-rate tracking of position and orientation of an object.

It is a further object of some aspects of the present invention to provide apparatus and methods for tracking of position and orientation of an object within a relatively larger area than comparable systems known in the art.

It is another object of some aspects of the present invention to provide apparatus and methods for tracking of position and orientation of more than one object.

It is still another object of some aspects of the present invention to provide apparatus and methods for tracking of position and orientation of an object with improved accuracy.

It is yet another object of some aspects of the present invention to provide more reliable apparatus and methods for tracking of position and orientation of an object.

It is an additional object of some aspects of the present invention to provide apparatus for tracking of position and orientation of objects, which is easily accommodated to changes in the tracking area and/or tracked objects.

In accordance with preferred embodiments of the present invention, a tracking system for tracking one or more objects includes a plurality of transmitting units (TU) fixed to the tracked objects. A plurality of three or more background units (BU), preferably at least five, more preferably at least eight, are distributed in a surveillance area, in which the objects are tracked, in order to receive waves from the transmitting units. The transmitting units transmit ultrasound waves, which are received by the background units. The background units receive only waves originating from transmitting units within a predetermined range from the background unit, in order to achieve a higher refresh rate as described below. Based on their propagation times, the positions of the transmitting units are determined.

A control unit initiates a position determining cycle by transmitting a radio frequency (RF) signal, which is received substantially simultaneously by the background units and the transmitting units. Upon receiving the RF signal, each of the transmitting units transmits an ultrasound wave of a frequency which is unique to the specific transmitting unit. At the same time, the background units open a time window, during which the units receive ultrasound waves. When the time window is opened the background units begin measuring time intervals from the trigger signal to the reception of the ultrasound waves. The background units determine the frequency-spectra of the waves they receive as a function of their propagation times. After the time window is closed, propagation information including the measured time intervals and/or arrival times is transferred, preferably by RF transmission, to the control unit, which calculates precise position coordinates of the objects in the surveillance area.

In some preferred embodiments of the present invention, at least three transmitting units are connected to each object which is tracked, so as to provide precise position and orientation tracking of the object, including all six dimensional coordinate readings. The transmitting units are preferably fixedly connected to the object by an adhesive, screws or any other mounting method. Alternatively or additionally, the transmitting units are partially embedded within the object.

Preferably, the number of transmitting units used in a tracking session may be varied without any adjustments to the background units or control unit. In order to use an additional transmitting unit all that is needed is to switch the power of the unit on. Preferably, the background units are set to receive frequencies of a large number of transmitting units, which are not necessarily in use in every tracking session.

Preferably, the transmitting units are small and standard, and have a user interface for setting the signal strength and pulse width of the transmitted wave. Preferably, the signal strength and pulse width of all the transmitting units are set remotely by an RF command sent to the transmitting units from the control unit. Further preferably, a user can set from the control unit other features of the transmitting units, such as whether to use acknowledgment signals. Alternatively or additionally, the signal strength, pulse width, frequencies and other features of the transmitting units are set separately by the user at each transmitting unit, or they are adjusted automatically by the control unit, to provide desired signal levels at the background units.

The background units are preferably located at fixed positions during an entire tracking session. The background units are distributed throughout the surveillance area, which may be as large as desired and may include a plurality of rooms which are separated by ultrasound barriers, such as walls. It is noted that ultrasound barriers dividing the surveillance area do not interfere with the operation of the tracking system of the present invention as long as a sufficient number of background units is used. The density of background units in the surveillance area is preferably such that at least three background units are within an unobstructed, predetermined range of substantially every point in the surveillance area. Additional density of background units provides higher accuracy of tracking. Preferably, regions of the surveillance area which have large interference rates, such as regions including moving ultrasound-barriers, have a higher density of background units. Thus, if one of the background units in the region temporarily does not provide propagation information, for example, due to a barrier separating the unit and the transmitting unit, the control unit will determine the position of the transmitting unit using information from other background units.

It is noted that adding and/or removing background units is very simple and preferably requires only minor adjustments at the control unit. Preferably, all that is necessary in order to add a background unit to the system is to enter the identification of the added unit to the list of active units held in the control unit, and to calibrate its position, as described below. Thus the density of units in the surveillance area may be changed easily. Also the size of the area may be extended by simply adding more background units. Preferably, background units may also be temporarily deactivated by removing their identification from the active list at the control unit, without physically removing the background units from the tracking area. Thus, it is possible to operate the system using any required number of units without recalibration and without physical placement or removal of units.

The background units contain an RF transmitting and receiving unit, which receives the trigger signal and transmits measurement information to the control unit. The background units further contain ultrasound receivers which receive the waves from the transmitting units, and processing circuitry which determines the frequencies of the received waves and their arrival times, as described above. The ultrasound receivers preferably have a wide angular detection field in order to have maximal reception of waves. Preferably, the arrival time of the wave from one of the transmitting units at the background unit is defined as the time in which the wave received by the background unit at the frequency of the transmitting unit first passes a threshold value. Alternatively, the arrival time is determined based on maximal amplitude of the wave during the time window. After the time window is closed, the arrival times, together with an identification code of the specific background unit, are transmitted to the control unit for further processing and position determination.

Alternatively or additionally, a phase shift of the received waves may be measured and used in determining the positions of the transmitting units. Any suitable method of phase detection known in the art may be used for this purpose, for example, as described in the above-mentioned U.S. Pat. No. 5,495,427. The transmitting units preferably transmit continuous-wave ultrasound signals. The background units receive the signals, and the distance propagated by these waves is determined according to a phase difference between the transmitted and received waves. The signal transmitted by the control unit is preferably used as a synchronization signal for measuring the phase shift.

In order to avoid recording interference as an arriving signal, a threshold for the strength of arriving ultrasound waves is preferably set in the background units. All ultrasound waves with a signal strength beneath the threshold are ignored. The threshold also prevents signals originating from distant transmitting units at one cycle from being recorded during a second cycle.

Preferably, the length of the time window is approximately the time it takes an ultrasound wave to propagate the predetermined range described above. The relationship between the signal strength of the waves of the transmitting units and the threshold of the background units is set such that ultrasound waves passing the full length of the predetermined range arrive at the background units with a signal strength slightly above the threshold value. The time between two position determining cycles is preferably longer than the time window, such that substantially all signals originating from a previous cycle will have strength beneath the threshold value at the beginning of a new cycle.

Upon receiving an ultrasound wave at a background unit, the wave is compared to the threshold and the wave is further processed only if the wave has an energy level above the threshold. Waves with strength above the threshold are associated with an internal clock slot. The waves are preferably converted to digital form and are then fed to a processing component which performs an FFT on the waves. The results of the FFT are used to record spectral information regarding the waves. Alternatively, any other suitable method may be used to determine the frequency spectrum of the waves. In an alternative embodiment of the present invention, the received waves are first filtered according to their frequencies by an array of filters, preferably in the analog domain. The outputs of the filters are preferably processed individually to recognize arriving waves from the transmitting units.

In some preferred embodiments of the present invention, the background units serve as relay stations for cases in which other background units have failed to establish contact with the control unit. Preferably, each background unit receiving the trigger signal repeats it so that background units and transmitting units at remote locations also receive the signal. Alternatively or additionally, the background units and transmitting units respond with an acknowledgment signal upon receiving the trigger signal. An additional signal is addressed, through neighboring units, to those units which did not respond.

Preferably, the background units are also capable of passing the arrival time information from the remote background units to the control unit. A hand-shaking protocol is defined to allow quick and precise information transfer. Preferably, the control unit requests from non-responding units to retransmit the arrival times, via a neighboring unit. The non-responding unit retransmits the arrival-time information together with an identification header addressing the neighboring unit. The neighboring unit consequently transmits the information to the control unit.

The control unit includes an RF transmitter and receiver, for transmitting the trigger signal and for receiving information from the background units, and a processor for determining the positions of the tracked objects. In order to begin a position determining cycle, the control unit transmits the trigger signal, which is preferably an RF signal of a particular frequency. In response to the trigger signal, the transmitting units transmit ultrasound waves, which are received by the background units. The background units transmit to the control unit the propagation information, which includes arrival times and/or time intervals of each of the waves they have received. The control unit calculates the position of each transmitting unit according to the arrival times of the waves. The arrival times are received from those background units which received the ultrasound wave of the particular transmitting unit. Preferably, each transmitting unit's wave is received by at least three background units. Further preferably, more than three background units receive the signals so as to enhance the accuracy of the position determination.

The control unit may calculate the positions of the transmitting units using any suitable known algorithm, as described, for example, in U.S. Pat. Nos. 5,412,619, 4,862, 152 and 4,807,202. Preferably, in cases when information is received from more than three background units, the position is calculated a few times, each time using the information from a different sub-combination of three background units. The different calculated positions are preferably averaged to produce a final result. Alternatively or additionally, the information from the different sub-combinations is used to check the arrival times for times which are suspected to be erroneous, and these times are preferably ignored. Preferably, the arrival times are compared to times received in previous cycles. Times which are substantially incongruous with times received in previous cycles are preferably ignored.

In other preferred embodiments of the present invention, each triggering signal initiates transmission of a sequence of ultrasound waves, rather than initiating only one transmission. The transmitting unit includes an inner timer which initiates the transmission at predetermined intervals. Preferably, the background units and/or the control unit include internal timers synchronized with the internal timers of the transmitting units. Using these timers, the background units and/or the control unit associate the received signals with corresponding, specific transmitted waves. Thus, there is no need to wait to receive a transmitted wave before the subsequent wave in the sequence is transmitted, and the refresh rate may be substantially increased. Due to the high refresh rate, the difference between the distance propagated by two consecutive waves from a given transmitting unit to the same background unit is very small. The difference between the propagation times of the two consecutive waves is consequently also small. The predetermined interval between consecutive transmitted waves is therefore set to be longer than the maximal possible difference between the propagation times of two consecutive waves, based on the maximal possible velocity of the transmitting units, so as to prevent errors in associating the received signals with the transmitted waves.

In further preferred embodiments of the present invention, properties other than the time-of-flight of the transmitted waves are used to determine the distance between the transmitting units and the background units. Such properties may include amplitude differences, phase shifts and frequency shifts. Preferably, more than one property is used in order to enhance the accuracy of determination.

In some preferred embodiments of the present invention, the velocities of the transmitting units are determined in addition to the positions of the units. Preferably, the position determining cycles are divided into groups. During the first cycle of each group, the positions of the transmitting units are determined. In the subsequent cycles of each group, the velocities of the units are determined, and changes in the positions are calculated based on the determined velocities. The positions of the transmitting units are thus calculated in the subsequent cycles by determining changes in the positions, rather than calculating the positions during each cycle from scratch. Thus, it is possible to substantially reduce the volume of calculations required for position determination, and relatively inexpensive hardware may be used for this purpose. Alternatively or additionally, the velocities are determined in addition to and independent of the positions of the units.

Preferably, the velocities of the transmitting units (both magnitude and direction) are determined based on Doppler shifts in the transmitted waves. Preferably, the differences between the frequencies assigned to different transmitting units are substantially larger than the Doppler shifts, so that the Doppler shifts do not affect the association of the received signals with the transmitting units.

In preferred embodiments of the present invention, in preparation for use of the tracking system, after the background units are fixedly positioned, a calibration procedure is performed. Preferably, three background units, which are at fixed, known positions relative to one another, serve as anchor points. Alternatively, any three background units are chosen as anchor points and the user places them during setup at predetermined distances from one another. Further alternatively, the positions of the three chosen anchor points are input to the control unit manually or by any other positioning method.

Preferably, during the calibration procedure, those background units which have unknown positions transmit an ultrasound wave which is identified by a receiving group. The receiving group, which includes those background units which have known positions, identifies the positions of the other background units in the same way the transmitting units are tracked. The control unit determines the positions of those units which were identified by three or more background units, and the identified units are passed to the receiving group. The calibration procedure is continued until the positions of all the background units are determined. Preferably, each background unit transmits a wave at distinct times during the calibration procedure. Alternatively, each background unit is assigned a different frequency, and a group of units transmit waves together. Preferably, the calibration procedure is repeated more than once in order to correct for inaccuracies in determining the positions of the background units.

Preferably, it is also possible to enter the positions of background units manually, in case a background unit is not identified by the neighboring units.

Although the preferred embodiments of the present invention have been described such that information is transferred from the background units to the control unit by RF transmission, it will be clear to those skilled in the art that the information may be passed through any other suitable transmission method, such as a wired connection. In a preferred embodiment of the present invention, some of the background units are connected by wires to the control unit, while others are not. Preferably, in areas distant from the control unit, at least one background unit is wire-connected to the control unit, so as to serve as a relay station for the units in its vicinity in case there are wireless communication difficulties.

Furthermore, it is also possible for the ultrasound waves to be transmitted from the background units and received and analyzed at the object. Transmitting (or receiving) units may also be fixed to multiple, independent objects, and the system will track the objects simultaneously. It will be understood by those skilled in the art that although preferred embodiments of the present invention are generally based on transmitting waves from the object to the background unit, substantially equivalent preferred embodiments may be produced by reversing the transmitting and receiving functions.

There is therefore provided in accordance with preferred embodiments of the present invention, a method of tracking an object within a surveillance area having a predetermined linear extent, including fixing one or more ultrasound transducers to the object, placing a plurality of background units at known positions in the area, each unit including an ultrasound transducer, transmitting one or more ultrasound waves between the object and the plurality of background units, receiving those of the ultrasound waves that propagate between the object and the background units within a time window of a duration such that the product of the duration and the speed of sound is substantially less than the linear extent of the detection area, determining a characteristic of the received ultrasound waves, and calculating coordinates of the object responsive to the characteristic.

Preferably, placing a plurality of background units in the area includes placing the background units such that for substantially every point in the area, ultrasound waves can propagate between the point and at least three of the background units within the time window.

Further preferably, placing the background units includes placing the background units such that for substantially every point in the area, ultrasound waves can propagate between the point and at least three of the background units along a direct path which is free of ultrasound barriers.

Alternatively or additionally, placing a plurality of background units in the area includes placing the background units such that for substantially every point in the area, ultrasound waves can propagate between the point and at least four of the background units within the time window.

Preferably, placing a plurality of background units in the area includes placing the background units such that for at least one or more of the background units, there are at least some points in the area to which ultrasound waves cannot propagate from the at least one or more background units within the time window.

Preferably, the method includes ignoring waves received outside the time window.

Preferably, placing a plurality of background units in the area includes placing at least five background units.

Further preferably, placing a plurality of background units in the area includes placing at least eight background units.

Preferably, transmitting one or more ultrasound waves includes transmitting waves from the one or more transducers fixed to the object, and wherein receiving the ultrasound waves includes receiving the waves at the transducers fixed to the plurality of background units.

Alternatively or additionally, transmitting one or more ultrasound waves includes transmitting waves from the transducers fixed to the plurality of background units, and wherein receiving the ultrasound waves includes receiving the waves at the one or more transducers fixed to the object.

Preferably, fixing one or more ultrasound transducers to the object includes fixing at least three ultrasound transducers to the object.

Preferably, the method includes coupling at least one ultrasound transducer to an additional object.

Further preferably, the method includes transmitting a trigger signal to initiate transmission of the ultrasound waves.

Preferably receiving the waves within the time window includes opening the window responsive to the trigger signal.

Preferably, transmitting the one or more waves includes transmitting a sequence of waves, and wherein receiving the waves within the time window includes opening a sequence of consecutive windows, each such window corresponding to one of the sequence of waves.

Preferably, determining the characteristic of the received waves includes measuring the time from receiving the trigger signal to receiving the waves.

Preferably, transmitting the trigger signal includes transmitting a signal over a wireless link.

Preferably, calculating the coordinates of the object includes transmitting the determined characteristic to a control unit over a wireless link.

Preferably, the method includes identifying a background unit from which the control unit has not received the characteristic and requesting re-transmission of the characteristic via another background unit in a vicinity of the identified background unit.

Preferably, transmitting includes transmitting an RF signal.

Preferably, transmitting one or more ultrasound waves includes transmitting ultrasound waves carrying unique identification of the transmitting transducer.

Preferably, transmitting ultrasound waves carrying the unique identification of the transmitting transducer includes transmitting ultrasound waves which have a distinct frequency identifying the transducer.

Preferably, determining the characteristic includes determining frequencies of the received waves.

Preferably, determining the frequencies of the received waves includes performing an FFT analysis.

Alternatively or additionally, determining the frequencies of received waves includes passing the received waves through a plurality of frequency-distinct filters.

Preferably, calculating coordinates of the object includes using a triangulation method.

Preferably, calculating coordinates of the object includes calculating the coordinates of the object independently for each of a plurality of sub-groups of the received waves and averaging the coordinates calculated for two or more of the plurality of sub-groups.

Preferably, the method includes repeatedly recalculating the coordinates of the object at a refresh rate that is substantially greater than the quotient of the speed of sound divided by the extent of the area.

Preferably, determining the characteristic includes determining times of flight.

Preferably, determining the characteristic includes determining a Doppler shift of the waves.

There is further provided in accordance with a preferred embodiment of the present invention, a method for calibrating an object tracking system, the system including a plurality of background units, each unit including an ultrasound transducer for ultrasonic sensing of the position of the object, the method including placing at least three of the background units in the respective locations having known position coordinates in a surveillance area, placing additional background units in other locations in the surveillance area, determining position coordinates of a first one of the additional units by transmitting ultrasound waves between the first additional unit and the at least three units having the known position coordinates, and determining position coordinates of a second additional unit by transmitting ultrasound waves between the second additional unit and the first additional unit.

Preferably, placing the additional background units includes placing the second additional unit in a position that is inaccessible for transmission of ultrasound waves between the second unit and at least one of the at least three background units having the known position coordinates.

Preferably, determining the position coordinates of the first and second additional units includes measuring times of flight of ultrasound waves transmitted or received by the units.

Preferably, determining the position coordinates of the first and second additional units includes communicating with at least some of the background units via a wireless link, so as to receive position-related data therefrom.

Preferably, the method includes determining position coordinates of the first and second additional units a second time, wherein the coordinates of the second additional unit are determined the second time with respect to the at least three units having the known position coordinates before determining the position coordinates of the first additional unit, and averaging the determined position coordinates to determine corrected position coordinates.

There is further provided in accordance with a preferred embodiment of the present invention, a system for tracking an object in a detection area, including at least one first ultrasound transducer, fixed to the object, a plurality of background units, each unit including a respective second ultrasound transducer, and a central unit, in wireless communication with at least either the first transducer or some of the background units, so as to receive information regarding transmission of ultrasound waves between the first and second ultrasound transducers and to determine coordinates of the object based on the information.

Preferably, the information includes time-of-flight data.

Alternatively or additionally, the information includes data regarding a Doppler shift of the waves.

Preferably, the system includes wireless receivers coupled to the first and second ultrasound transducers, which receive a trigger signal to initiate the transmission of ultrasound waves between the transducers.

Preferably, the system includes wireless transmitters coupled to the first and second transducers, which transmit an acknowledgment signal responsive to the trigger signal.

Preferably, the central unit transmits the trigger signal.

Preferably, the at least one first ultrasound transducer transmits the ultrasound waves, and the second transducers receive the waves.

Preferably, the at least one first transducer includes a plurality of ultrasound transducers, each of which transmits waves having a characteristic which identifies their respective transmitting transducer.

Preferably, the characteristic includes a unique frequency.

Preferably, the background units include signal processing circuitry, which analyzes the frequencies of the waves and determines their respective times-of-flight.

Preferably, the signal processing circuitry includes a plurality of frequency distinct filters.

Alternatively or additionally, the signal processing circuitry includes an FFT processor.

Preferably, the background units open a time window of a predetermined duration for receiving the ultrasound waves, responsive to the trigger signal.

Preferably, the product of the duration of the time window and the speed of sound is substantially less than the extent of the detection area.

Preferably, the wireless communication includes RF communication.

Preferably, the plurality of background units includes at least five background units.

Further preferably, the plurality of background units includes at least eight background units.

Preferably, the transducers transmit a plurality of ultrasound waves of distinct frequencies.

The present invention will be more fully understood from the following detailed description of the preferred embodiments thereof, taken together with the drawings, in which:

BRIEF DESCRIPTION OF THE DRAWINGS

FIG. 2A is a schematic timing diagram for the tracking system of FIG. 1, in accordance with a preferred embodiment of the present invention;

FIG. 3 is a block diagram of a transmitting unit, in accordance with a preferred embodiment of the present invention;

FIG. 4 is a block diagram of a background unit, in accordance with a preferred embodiment of the present invention;

DETAILED DESCRIPTION OF PREFERRED EMBODIMENTS

Figure 1:
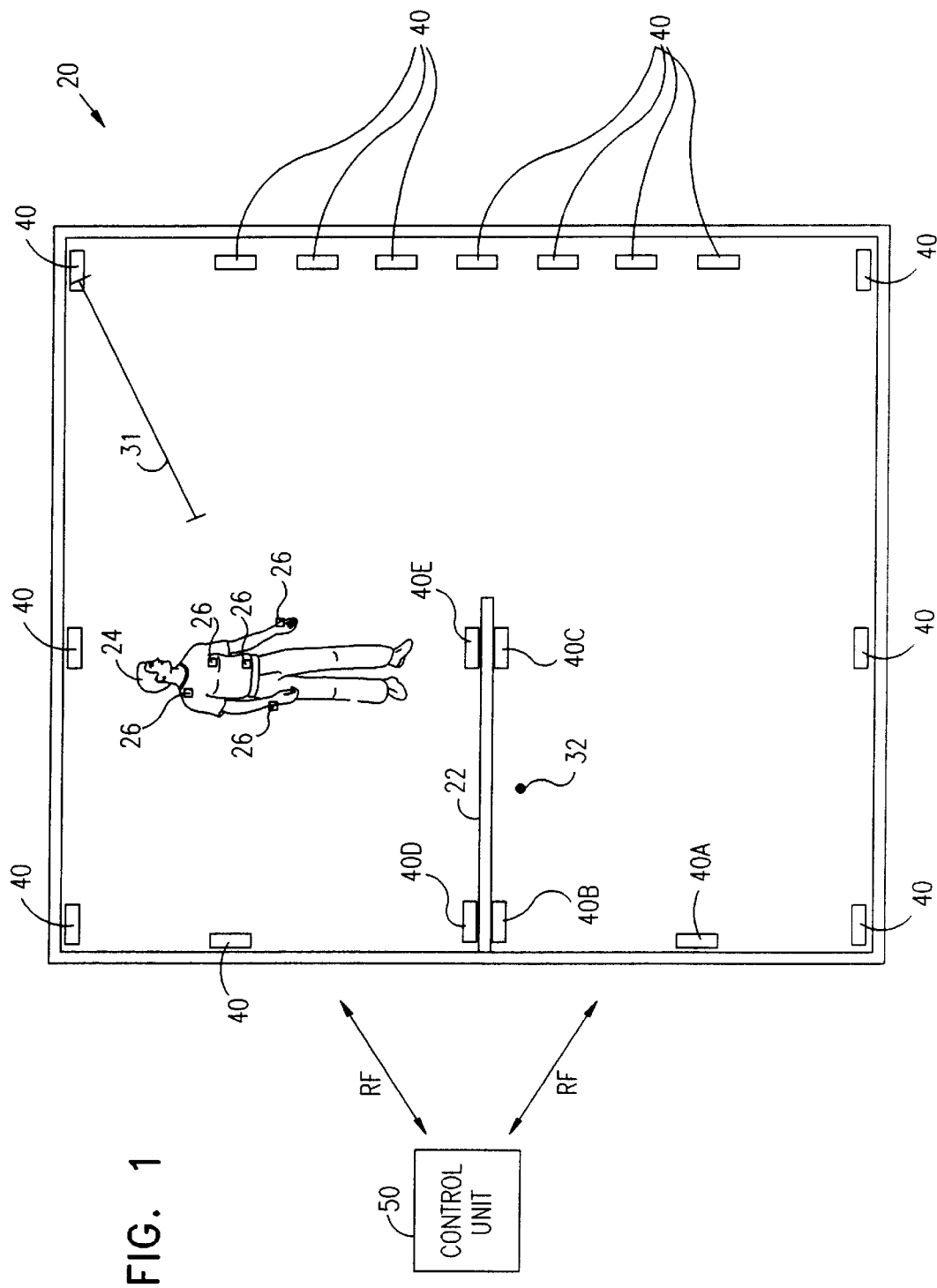
FIG. 1 is a schematic view of a surveillance area including a tracking system, in accordance with a preferred embodiment of the present invention.

FIG. 1 is a schematic diagram of a surveillance area 20, in which a person 24 is tracked, in accordance with a preferred embodiment of the present invention. A plurality of transmitting units 26 are attached to person 24 in order to track his movements. Only a few transmitting units 26 are shown in FIG. 1 for reasons of clarity. However, substantially any number of transmitting units may be attached to person 24, limited only by the number of available distinct ultrasound frequencies in area 20. Preferably, at least one transmitting unit 26 is attached to each limb of person 24 which is tracked. More preferably, at least three transmitting units 26 are attached to each limb so as to provide precise position and orientation tracking of the limb. Each transmitting unit is assigned a distinct ultrasound frequency in which the transmitting unit transmits ultrasound waves, which are detected by background units 40. Units 40 determine the propagation times of the waves, and transfer the propagation times, optionally together with identification information, as described below, to a control unit which determines the positions of the transmitting units.

Background units 40 are distributed within area 20 such that each point within the area, such as a point 32, is within a predetermined range, for example as indicated by a bar 31, of at least three background units. Preferably, background units 40 are distributed at a higher density so that most points are within the predetermined range of four or more of the units. Thus, if one of background units 40 does not operate, or the path between a transmitting unit 26 and the unit is momentarily obstructed, the tracking continues undisturbed. In addition, tracking by more than three units 40 provides higher accuracy of position determination. A larger density of background units 40 also allows use of a shorter predetermined range 31, thus achieving better accuracy, and allowing a higher refresh rate, i.e., more position, determining cycles within a fixed period of time.

Area 20 is not necessarily free of ultrasound barriers. In the figure this feature s demonstrated by a wall 22, which is an ultrasound wave barrier. A point 32 is within the predetermined range of units 40A, 40B and 40C. Units 40D and 40E are not considered as situated within the predetermined range of point 32, since the path from units 40D and 40E to point 32 is obstructed. Although waves originating from point 32 may arrive at units 40D and 40E by propagating around wall 22, the path around the wall is longer than the predetermined range. Alternatively or additionally, the propagation time results from units 40D and 40E, if received, will be ignored due to their discrepancy relative to the results from units 40A, 40B and 40C.

Control unit 50 is preferably located within RF transmission range of at least some of background units 40. Further preferably, most of units 40, and most preferably substantially all of units 40, are within RF transmission range of control unit 50. However, it is noted that control unit 50 is not necessarily within area 20 or at any fixed point relative to area 20. Control unit 50 may be mounted, for example, on a moving vehicle, during a tracking session.

FIG. 2A is a schematic diagram showing time division during a tracking session, in accordance with a preferred embodiment of the present invention. In a tracking session control unit 50 periodically initiates a position determining cycles, by transmitting an RF trigger signal 43 (or 46) of a predetermined frequency and pulse shape. The trigger signal is received by transmitting units 26 and background units 40. Preferably, background units 40 retransmit the trigger signal in order to reduce the chance that remote units do not receive the trigger signal. Alternatively or additionally, each unit responds with an acknowledgment signal, carrying an ID identifying the unit, responsive to the trigger signal. If there are any units whose acknowledgment signals were not received by control unit 50, the trigger signal is re-sent via neighboring units, preferably in a hand-shaking procedure, as described below. Since RF signals are transmitted at the speed of light, it can be assumed that the trigger signal is received effectively instantaneously at all transmitting units 26 and background units 40.

When transmitting units 26 receive the trigger signal, each transmitting unit transmits its frequency-distinct ultrasound wave and returns to a pause state until another trigger signal is received.

When background units 40 receive the trigger signal each unit opens a time window 44, in which the background units are enabled to receive ultrasound waves. For each wave received while the window is open, unit 40 determines its frequency and arrival time, as will be further described.

The time windows are closed after a predetermined time interval, which is preferably the time it takes an ultrasound wave to propagate the predetermined range 31. After time window 44 is closed, ultrasound waves are ignored by background units 40, and the background units transfer to control unit 50 pairs of frequency identifications and arrival times along with the identification of the specific background unit. This information is preferably transferred by coded RF transmission, as is known in the art. The information is preferably transferred from the background units in a preset arbitrary order. A rest-interval 45 is left between the closing 47 of the time window and the next trigger signal, to allow transfer of information to control unit 50, and to prevent waves transmitted responsive to one trigger signal 43 and propagating a long distance, from being mistaken as originating responsive to a subsequent trigger signal 46 from a close transmitting unit. Preferably, the rest interval is short so as to allow a higher refresh rate.

Preferably, background units 40 ignore waves that have a signal strength lower than a predetermined threshold value. The signal strength at transmitting units 26 of the transmitted waves is preferably such that waves originating responsive to trigger signal 43 have a signal strength above the threshold value during window 44 and a signal strength below the threshold value by the time of trigger 46.

The duration of a single position determining cycle 48 includes time window 44 and rest interval 45. Since rest interval 45 is preferably short, the refresh rate is strongly dependent on the duration of time window 44. As described above, time window 44 is of a length of about the time it takes for ultrasound waves to propagate predetermined range 31. Therefore, it is possible to achieve a higher refresh rate by placing a higher density of units 40 in area 20. In an exemplary setup the maximal distance from a point in area 20 to three units 40 is between two and three meters. The speed of sound is about 300 meters per second, and therefore the time window is of a length of about 6–10 msec. The rest interval is between about 2 and 10 msec, depending on the specific application of the tracking system, and thus the refresh rate is between 50 and 125 Hz. It is noted that prior art systems have refresh rates of about 32–128 Hz, but only in an area of very limited diameter.

Figure 2B:
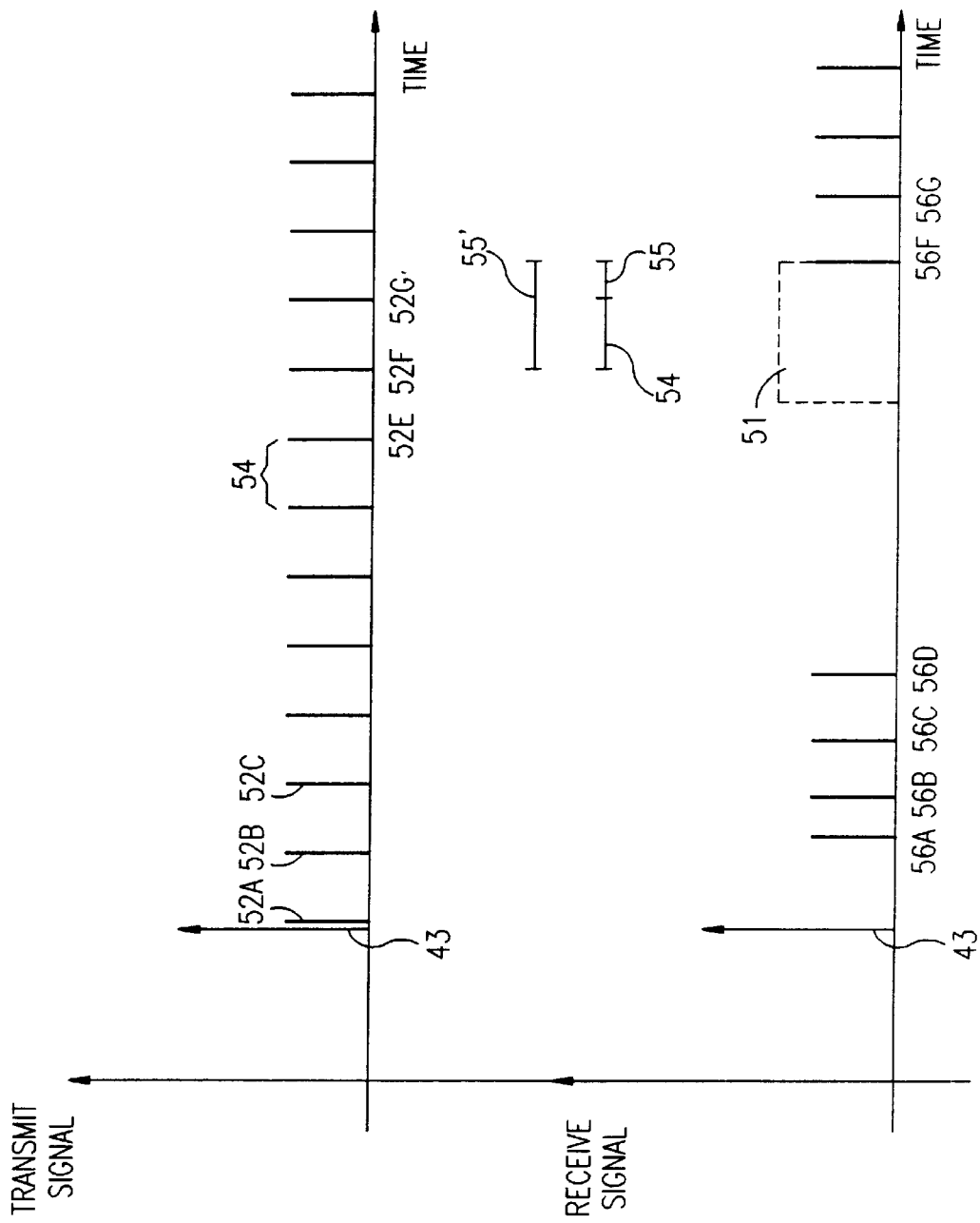
FIG. 2B is a schematic timing diagram for the tracking system of FIG. 1, in accordance with another preferred embodiment of the present invention.

FIG. 2B is a schematic diagram showing time division in the transmitting and background units during a tracking session, in accordance with another preferred embodiment of the present invention. In this case, in order to achieve a higher refresh rate, a sequence of waves is transmitted, and substantially no rest-interval is left between the waves of the sequence.

In response to trigger signal 43, each transmitting unit 26 transmits at a predetermined rate a sequence of ultrasound waves 52, preferably with a constant interval 54 between consecutive waves 52. Preferably, trigger signal 43 is followed by, or otherwise includes, indication of the number of waves 52 in the group. Background units 40 include internal timers, which are synchronized to the times of transmissions of waves 52. Background units 40 constantly listen for signals from units 26. When one of the background units receives a signal 56 above the threshold at a specific frequency, it assumes that the signal has a propagation time similar to the propagation times of recent earlier waves from the same transmitting unit 26. Due to the high refresh rate achieved by this preferred embodiment, the possible difference in propagation times between two consecutive waves is small.

When one of the background units receives a wave from one of the transmitting units for which the background unit has no record of earlier arrivals, such as for one of units 26 which has entered a new region, it is assumed to correspond to the earliest wave 52 which was transmitted less than the length of a decay time 51 before the arrival. Decay time 51 is the time in which waves 52 typically lose enough energy so as not to pass the threshold when detected. Preferably, decay time 51 is approximately equal to the duration of window 44. Specifically, signal 56F received by background unit 40 is assumed to have originated from transmitting unit 26 within decay time 51 before the background unit received it. Signal 56F could not have originated from wave 52E, since the signal would have been below the threshold by the end of decay time 51 from its transmission to its detection.

Preferably, error detection methods are employed to prevent use of erroneous data. For example, signals 56 detected substantially more than constant interval 54 after the previous detected signal of the same frequency are preferably ignored. Alternatively or additionally, the velocities of units 26 are estimated based on the signals received therefrom, preferably based on Doppler shifts of the signal frequencies. The velocities are compared against changes in the calculated position data in order to identify and weed out errors. It is noted that even if a given wave 52 is not detected by one of units 40, causing a transient error in the tracking, the error does not affect further tracking once a new triggering signal 43 has been transmitted.

FIG. 3 shows a block diagram of transmitting unit 26, in accordance with a preferred embodiment of the present invention. Transmitting unit 26 includes an RF receiver 60 which receives RF signals via an antenna 61. The signals are passed to a decoder 62 which checks the received signal for a predefined waveform of the trigger signal. If the trigger signal is recognized, the decoder passes a command to an ultrasound transducer 64 which transmits an ultrasound wave. Transducer 64 preferably comprises a wide-angle transducer, most preferably omnidirectional, so as to provide maximal reception by the background units. Transducer 64 is preferably configured to transmit a short ultrasound pulse at a well defined frequency. Preferably, the frequency may be set by the user, directly or via the control unit. Alternatively or additionally, transducer 64 is as described in U.S. Pat. No. 4,459,853.

Preferably, decoder 62 also recognizes other wave-forms which are used by control unit 50 as control signals to set operational settings of transducer 64, such as signal strength, pulse width, etc. Preferably, transmitting unit 26 further comprises an RF transmitter 66, which transmits to control unit 50 an acknowledgment signal, unique to the particular transmitting unit, responsive to the trigger signal.

FIG. 4 shows a block diagram of background unit 40, in accordance with a preferred embodiment of the present invention. Unit 40 includes an RF receiver 70 which receives RF waves via an antenna 71 and transfer them to a decoder 72. Decoder 72 initiates actions according to the received signal. A clock 74 is included in unit 40 to control time window 44.

Unit 40 also includes an ultrasound receiver 76, along with a frequency analyzer unit 77. Receiver 76 preferably comprise a transducer with a wide range of frequency response (not necessarily homogeneous) and a wide angular field. Receiver 76 may be for example as described in U.S. Pat. No. 4,391,137, which is incorporated herein by reference. Unit 77 preferably includes a threshold filter 78 which passes on only signals which have a signal strength above a predetermined threshold. Preferably, unit 77 also includes a filter 79 which removes peaks below a predefined integrated energy intensity. Unit 77 further includes an A/D converter 80 which converts the received waves to a digital signal for frequency analysis by an FFT processor 82, as is known in the art.

Alternatively or additionally, frequency extracting unit 77 includes a common-frequency-filter array coupled with intensity indicators which perform signal frequency determination, as is known in the art.

Preferably, unit 40 includes a memory 84, in which arrival times and frequencies are stored, and an encoder 86, which prepares the contents of memory 84 for transmission by an RF transmitter 88 to control unit 50.

Preferably, decoder 72 recognizes various control signals which are sent from control unit 50. The control signals are used to set operation settings of unit 40, such as duration of the time window, signal strength threshold, etc.

Figure 5:
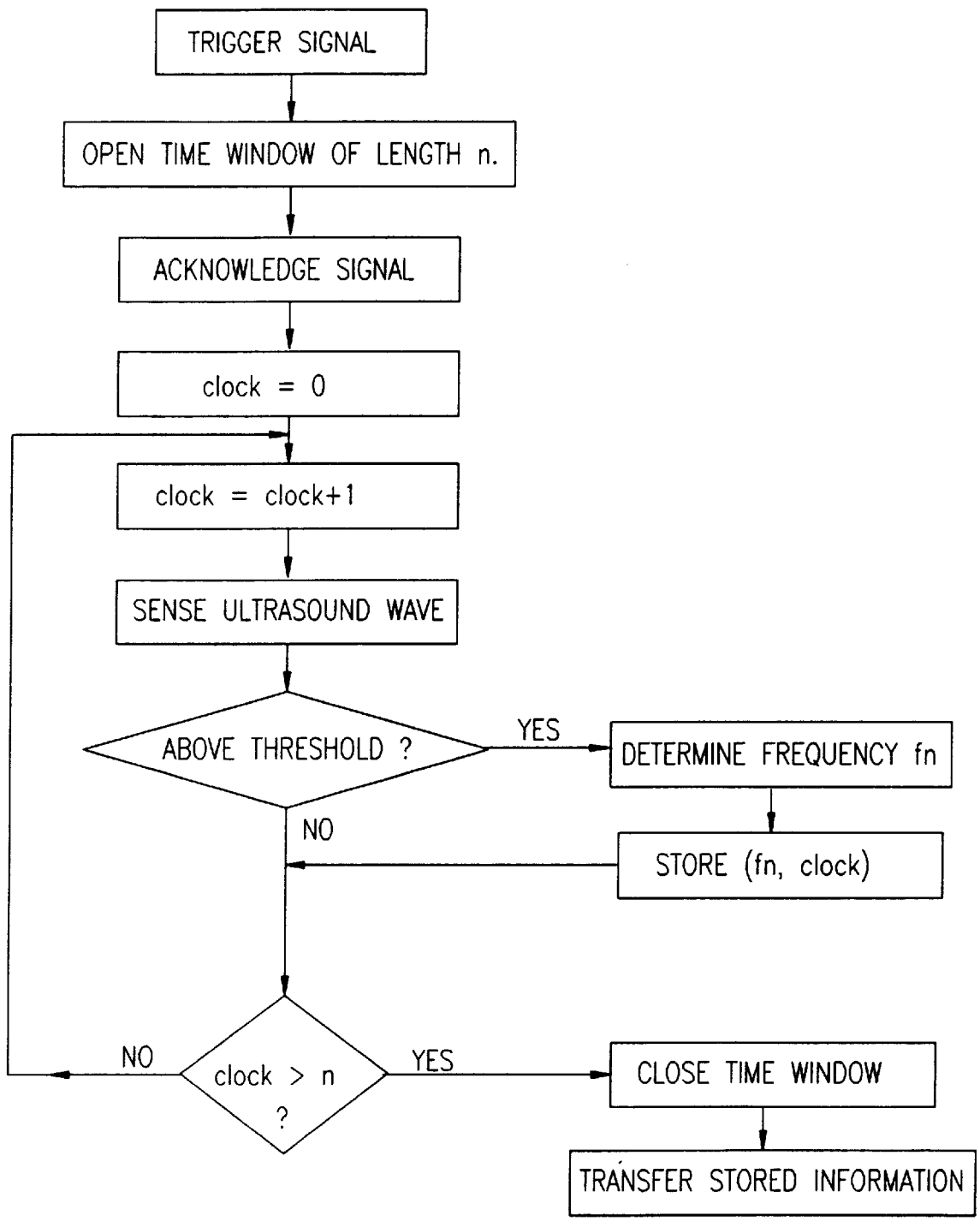
FIG. 5 is a flow chart showing the operation of a background unit responsive to a trigger signal, in accordance with a preferred embodiment of the present invention.

FIG. 5 is a flow chart showing the operation of background unit 40 responsive to a trigger signal, in accordance with a preferred embodiment of the present invention. When decoder 72 recognizes the trigger signal it opens the time window, controlled by clock 74. Preferably, background unit 40 transmits a unit-unique acknowledgment signal to control unit 50, responsive to the trigger signal. The time window is divided into time slots which are used to measure propagation times. For each slot, unit 40 senses the ultrasound wave and passes it through filter 78 to eliminate noise. If the wave has a signal strength above the threshold value, its frequency is determined and recorded together with the corresponding time slot. This process continues until the time window is closed. The stored frequencies and arrival times are then transferred to control unit 50 for processing.

Alternatively, the sensed ultrasound wave is first passed through an array of filters, preferably analog filters, to separate the wave into frequency band signals corresponding to the frequencies used by the transmitting units. Each signal is checked independently to find the first time slot in which the signal strength is above the threshold. Preferably, the signal checking is performed simultaneously for all the signals from all of the filters.

Figure 6:
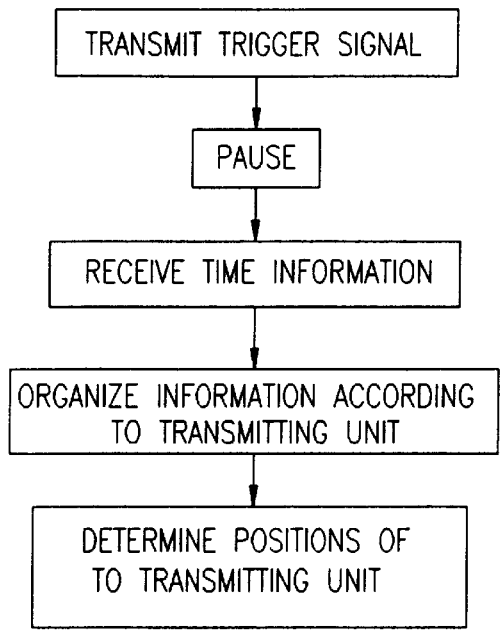
FIG. 6 is a flow chart showing the operation of a control unit, in accordance with a preferred embodiment of the present invention.

FIG. 6 is a flow chart showing the operation of control unit 50, in accordance with a preferred embodiment of the present invention. Control unit 50 transmits the trigger signal periodically according to the refresh rate. When time window 44 is closed, control unit 50 receives the propagation time information from units 40 according to a predefined order. Each unit 40 transfers the information together with unique identification of the transferring unit. After all the information of is received, control unit 50 contains information as shown for example in Table 1A.

TABLE 1A

| BU #1 | | BU #2 | | BU #3 | | BU #4 | | BU #5 | | BU #6 | |
|---|---|---|---|---|---|---|---|---|---|---|---|
| TU | time | TU | time | TU | time | TU | time | TU | time | TU | time |
| 1 | 13 | 2 | 5 | 2 | 15 | | | 1 | 7 | 1 | 8 |
| 2 | 7 | | | 3 | 5 | | | 2 | 6 | | |
| 3 | 6 | | | 4 | 8 | | | 3 | 16 | | |
| 4 | 16 | | | | | | | 4 | 5 | | |

Table 1A shows an example of the information received by unit 50 during rest interval 45. The information is in arbitrary time units and is for exemplary purposes only. Control unit 50 preferably groups the arrival times according to the transmitting units 26 from which they originated, which are known by the frequencies of the waves. This grouping is shown in Table 1B.

TABLE 1B

| TU #1 | | TU #2 | | TU #3 | | TU #4 | |
|---|---|---|---|---|---|---|---|
| BU | time | BU | time | BU | time | BU | time |
| 1 | 13 | 1 | 7 | 1 | 6 | 1 | 16 |
| 5 | 7 | 2 | 5 | 3 | 5 | 3 | 8 |
| 6 | 8 | 3 | 15 | 5 | 16 | 5 | 5 |
| | | 5 | 6 | | | | |

According to the propagation times of the waves of each transmitting unit 26, control unit 50 calculates the position of the transmitting unit in a triangulation method as is known in the art and described, for example, in U.S. Pat. No. 4,862,152.

Preferably, in each position determining cycle, when information is received from more than three background units for any given transmitting unit, the extra information is used to enhance accuracy of the position determination of those transmitting units. Preferably, the background units from which information is received are divided into subgroups, each comprising three background units, and triangulation is performed separately for each sub-groups. Preferably, each sub-group includes two background units in common with at least one other sub-group. Alternatively, the set of sub-group is formed of a minimal number of subgroups necessary to include all the background units which provided information.

Preferably, control unit 50 checks the received information for errors. When information is received from more than three background units, calculations are performed to determine whether any of the units has supplied erroneous information. If information from a single background unit is substantially discrepant relative to information from the other background units, the information from the single unit is ignored.

Preferably, propagation times received by background units are compared to the propagation times from preceding position determining cycles. If the difference between the propagation time from any given transmitting unit to any given background unit in a present cycle and that in a previous cycle is larger than a predetermined value, the propagation time of the present cycle is regarded as erroneous. This type of error-checking routine is made possible due to the high refresh rate, which limits the possible difference in the propagation time between consecutive cycles.

As can be seen in Table 1A, not all the background units take part in every position determining cycle. This is because in preferred embodiments of the present invention, different regions of surveillance area 20 are surveyed by different subgroups of background units 40. Thus, it is possible to include large regions within area 20, without reducing the refresh rate.

Figure 7:
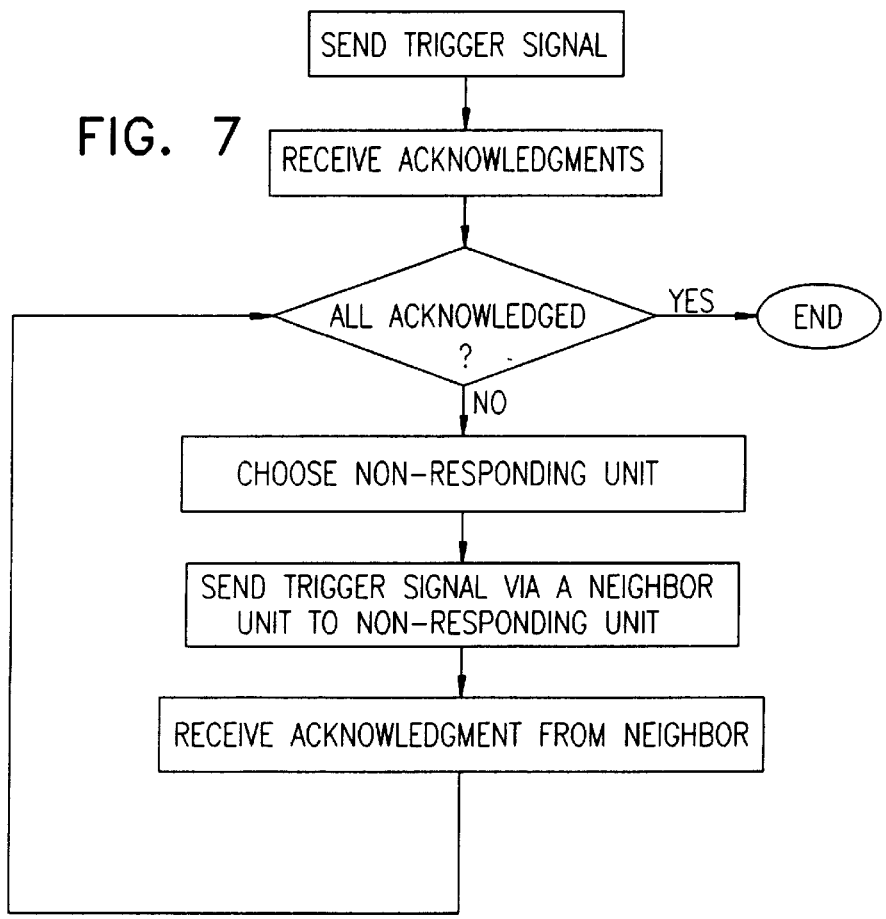
FIG. 7 is a flow chart showing the operation of the control unit during a trigger-signal hand-shaking procedure, in accordance with a preferred embodiment of the present invention.

FIG. 7 is a flow chart showing the operation of control unit 50 during a trigger-signal hand-shaking procedure, in accordance with a preferred embodiment of the present invention. The procedure ensures that all the units have received the trigger signal.

As described above, to start a position determining cycle, control unit 50 transmits a trigger signal to transmitting units 26 and background units 40. Preferably, transmitting units 26 and background units 40, respond with respective acknowledgment signals which carry the identification of the responding unit. Control unit 50 checks that it has received an acknowledgment signal from all the units. For those units which have not responded, control unit 50 sends an addressed signal to a neighboring unit, which is preferably a background unit, with a request to send a support trigger signal to the non-responding unit. Preferably, the neighboring unit is chosen as the unit at the smallest unobstructed distance from the non-responding unit. Preferably, for each unit, control unit 50 records its neighboring unit during a calibration procedure, as described below. Alternatively or additionally, the neighboring units are determined dynamically during position tracking operation of the system. The neighboring unit passes the support trigger signal to the non-responding unit and preferably passes its acknowledgment signal back to control unit 50.

In a preferred embodiment of the present invention, a similar hand-shaking procedure is performed during information transfer from background units 40 to control unit 50.

Figure 8:
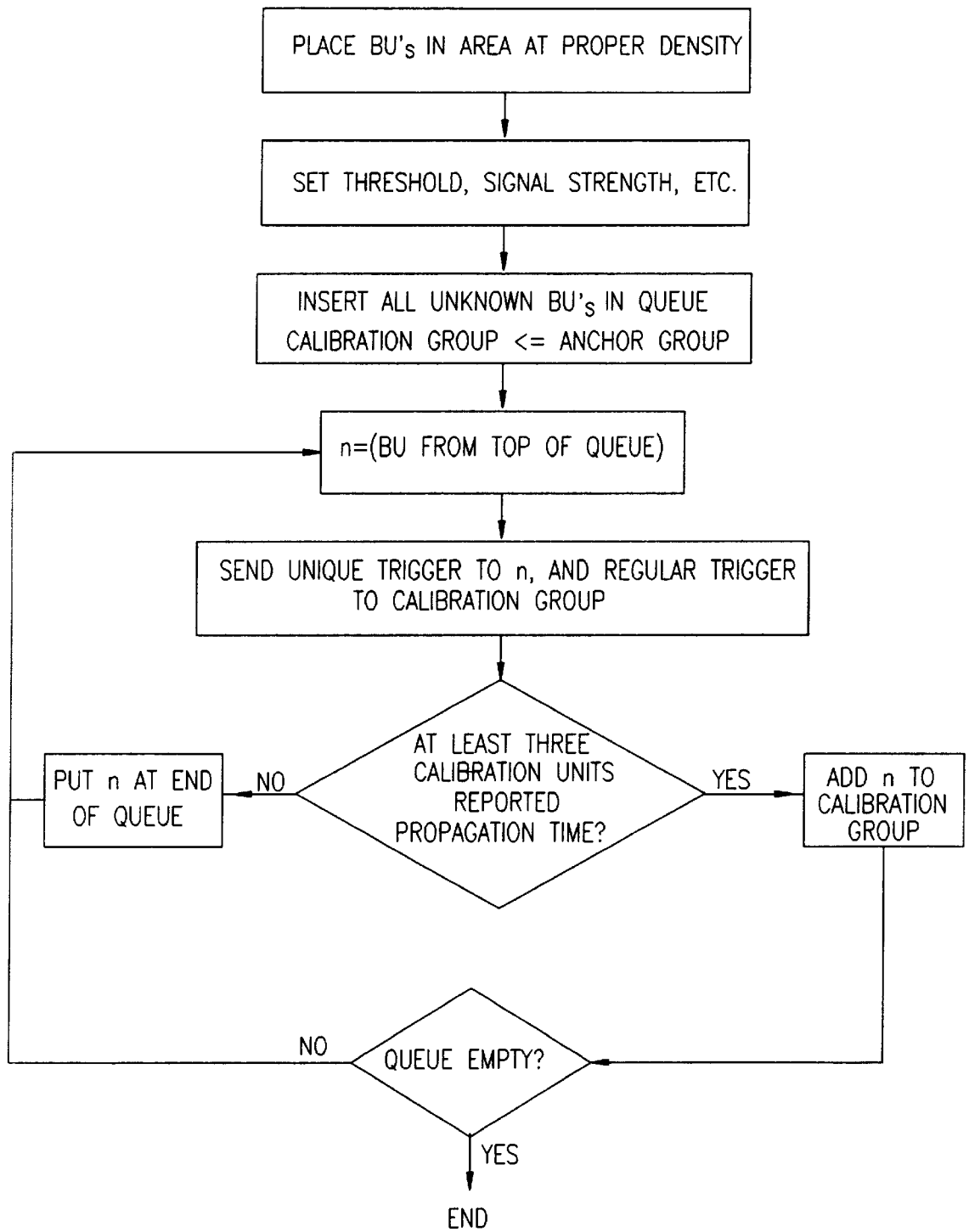
FIG. 8 is a flow chart of the actions performed in setting up and calibrating the tracking system, in accordance with a preferred embodiment of the present invention.

FIG. 8 is a flow chart showing the actions performed in setting up and calibrating the tracking system in area 20, in accordance with a preferred embodiment of the present invention. According to the desired predetermined maximal propagation range 31, background units 40 are positioned throughout the surveillance area in a density such that each point in the area is within an unobstructed path smaller than predetermined range 31 from at least three background units. To calibrate the system, at least three background units which are at fixed and known positions, are used as anchor units. Preferably, the anchor units are located together on a rigid board or frame and the distances between them are stored in control unit 50. Alternatively any three background units may be used and their positions may be input to control unit 50 manually or by another positioning method. Preferably, after calibration is complete the anchor background units are also used during position determining cycles. Alternatively, the anchor background units are used only during calibration.

In the calibration procedure, a group of calibration units initially formed of the anchor units service as background units for determining the positions of the remaining background units, whose positions as yet are unknown. These remaining background units function as transmitting units which are to be located in relation to the anchor units. Once the position of a background unit is determined, it is then used, along with the anchor units, in finding and calibrating the positions of the remaining background units.

As long as there are units which have unknown locations, one such unit which is to be located is selected, and an addressed trigger is sent to it substantially simultaneously with a regular trigger signal, which is received by the calibration units. The addressed unit transmit an ultrasound wave which is received by the calibration background units. The calibration units measure propagation time from the unit to be located and transfer the results to the control unit according to a procedure similar to that used in tracking of transmitting units. If at least three calibration units transfer propagation times, the control unit determines the position of the selected unit, in the same manner in which it determines the positions of the transmitting units during tracking. The position of the selected unit is then recorded and the selected unit is entered into the calibration group. Preferably, control unit 50 also records one of the calibration units which received its transmitted wave as its neighboring unit, for reference in hand-shaking procedures. If, however, not enough calibration units received signals from the selected unit, determining its position is postponed to a later time when more units are within the calibration group. Preferably, the members of the unknown group are ordered in a queue, and units which were not located are moved to the end of the queue. The control unit then proceeds in selecting another background unit from the unknown group, and the above described process is repeated until all the background units are in the calibration group.

Alternatively or additionally, the background units are also assigned unique frequencies, possibly the same frequencies as used by the transmitting units, since the background units use these frequencies only during calibration. The control unit transmits a single trigger signal to which the unknown units respond by transmitting their unique ultrasound wave and the calibration units act as regular background units. The control unit receives propagation time information from the calibration units, and those units which are located are passed to the calibration group. Thus the calibration process may be carried out in fewer steps than when the position of each background unit is determined separately.

Preferably, the calibration procedure is performed more than once so as to minimize errors. Preferably, a first procedure is performed, in which approximate positions of the background units are determined and recorded. Subsequently, one or more additional procedures are performed in order to adjust and improve the accuracy of the results from the first procedure. In one preferred embodiment of the present invention, the additional procedures start with the anchor units in the calibration group just as in the first procedure, and the order in which the background units are calibrated is also the same as in the first procedure. Alternatively, the order in which the background units are calibrated is reversed or otherwise shuffled. Further alternatively, some or all of the additional procedures may begin with different calibration groups, which may include background units other than the anchor units. These initial background units are used to calibrate other background units based on their positions as determined in earlier procedures.

Preferably, the results of the calibration procedures are averaged to determine final positions of the background units with minimal errors.

In another preferred embodiment of the present invention, an additional calibration procedure is performed in which groups of three or more background units are selected and used to determine the positions of other background units. The results are averaged with the results determined during earlier procedures. Another group of background units is then chosen and the position of another background unit is corrected by averaging. This process continues until the results converge, and the discrepancy between the earlier results and those recently acquired are smaller than a predetermined allowed error value.

It will be appreciated that although in the above-described preferred embodiments, information transfer to the control unit is performed via RF transmission, any other method of fast data transfer may be used, such as wire or fiberoptic transfer. However, use of wireless information transmission allows greater freedom of use of the tracking system.

It will further be appreciated that although in the above described preferred embodiments, the transmitting units are uniquely identified according to the frequencies of the waves they transmit, the identification of the transmitting units may be performed by any other suitable method, such as, pulse sequences.

It is also noted that the background units of preferred embodiments of the present invention may detect phase-related variations in the received ultrasound waves, as well as amplitude changes or frequency differences, in addition to time-of-flight determination, in order to determine the distance between transmitting units and background units with greater accuracy.

It will be appreciated that the preferred embodiments described above are cited by way of example, and the full scope of the invention is limited only by the claims.

What is claimed is:

1. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic; and wherein placing a plurality of background units in the area comprises placing the background units such that for at least one or more of the background units, there are at least some points in the area to which ultrasound waves cannot propagate from the at least one or more background units within the time window.

2. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves; and calculating coordinates of the object responsive to the characteristic, wherein placing a plurality of background units in the area comprises placing the background units such that for substantially every point in the area, ultrasound waves can propagate between the point and at least three of the background units within the time window.

3. The method of claim 1, wherein placing the background units comprises placing the background units such that for substantially every point in the area, ultrasound waves can propagate between the point and at least three of the background units along a direct path which is free of ultrasound barriers.

4. The method of claim 1, wherein placing a plurality of background units in the area comprises placing the background units such that for substantially every point in the area, ultrasound waves can propagate between the point and at least four of the background units within the time window.

5. The method of claim 1, wherein determining the characteristic comprises determining times of flight.

6. The method of claim 1, and comprising ignoring waves received outside the time window.

7. The method of claim 1, wherein transmitting one or more ultrasound waves comprises transmitting ultrasound waves carrying unique identification of the transmitting transducer.

8. The method of claim 7, wherein transmitting ultrasound waves carrying the unique identification of the transmitting transducer comprises transmitting ultrasound waves which have a distinct frequency identifying the transducer.

9. The method of claim 8, wherein determining the characteristic comprises determining frequencies of the received waves.

10. The methods of claim 1, wherein transmitting one or more ultrasound waves comprises transmitting waves from the transducers fixed to the plurality of background units, and wherein receiving the ultrasound waves comprises receiving the waves at the one or more transducers fixed to the object.

11. The method of claim 1, wherein fixing one or more ultrasound transducers to the object comprises fixing at least three ultrasound transducers to the object.

12. The method of claim 1, and comprising coupling at least one ultrasound transducer to an additional object.

13. The method of claim 1, wherein calculating the coordinates of the object comprises transmitting the determined characteristic to a control unit over a wireless link.

14. The method of claim 13, wherein transmitting comprises transmitting an RF signal.

15. The method of claim 1, wherein calculating coordinates of the object comprises using a triangulation method.

16. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic; and comprising transmitting a trigger signal to initiate transmission of the ultrasound waves.

17. The method of claim 16, wherein transmitting the trigger signal comprises transmitting signal over a wireless link.

18. The method of claim 16, wherein receiving the waves within the time window comprises opening the window responsive to the trigger signal.

19. The method of claim 16, wherein transmitting the one or more waves comprises transmitting a sequence of waves, and wherein receiving the waves within the time window comprises opening a sequence of consecutive windows, each such window corresponding to one of the sequence of waves.

20. The method of claim 16, wherein determining the characteristic of the received waves comprises measuring the time from receiving the trigger signal to receiving the waves.

21. A system for tracking an object in a detection area, comprising:

at least one first ultrasound transducer, fixed to the object;

a plurality of background units, each unit comprising a respective second ultrasound transducer;

a central unit, in wireless communication with at least either the first transducer or some of the background units, so as to receive information regarding transmission of ultrasound waves between the first and second ultrasound transducers and to determine coordinates of the object based on the information; and wherein the plurality of background units comprises at least five background units.

22. The system of claim 21, wherein the plurality of background units comprises at least eight background units.

23. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic; and wherein placing a plurality of background units in the area comprises placing at least five background units.

24. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic, wherein transmitting one or more ultrasound waves comprises transmitting ultrasound waves carrying unique identification of the transmitting transducer;

wherein transmitting ultrasound waves carrying the unique identification of the transmitting transducer comprises transmitting ultrasound waves which have a distinct frequency identifying the transducer;

wherein determining the characteristic comprises determining frequencies of the received waves; and wherein determining the frequencies of the received waves comprises performing an FFT analysis.

25. A method of tracking an object within a surveillance area having a predetermined linear extent, comprising:

fixing one or more ultrasound transducer to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic, wherein transmitting one or more ultrasound waves comprises transmitting ultrasound waves carrying unique identification of the transmitting transducer;

wherein transmitting ultrasound waves carrying the unique identification of the transmitting transducer comprises transmitting ultrasound waves which have a distinct frequency identifying the transducer;

wherein determining the characteristic comprises determining frequencies of the received waves; and wherein determining the frequencies of received waves comprises passing the received waves through a plurality of frequency-distinct filters.

26. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration an the speed of sound is substantially less than the linear extent of the detection are;

determining a characteristic of the received ultrasound waves;

calculating coordinates of the object responsive to the characteristic; and wherein placing a plurality of background units in the area comprises placing at least eight background units.

27. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic; and wherein calculating coordinates of the object comprises calculating the coordinates of the object independently for each of a plurality of sub-groups of the received waves and averaging the coordinates calculated for two or more of the plurality of sub-groups.

28. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic; and comprising repeatedly recalculating the coordinates of the object at a refresh rate that is substantially greater than the quotient of the speed of sound divided by the extent of the area.

29. A method of tracking an object within a surveillance area having a predetermined linear extent, comprising:

fixing one or more ultrasound transducer to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less then the linear extent of the detection area;

determining a characteristic of the record ultrasound waves;

calculating coordinates of the object responsive to the characteristic; and wherein transmitting one or more ultrasound waves comprises transmitting waves from one or more transducers fixed to the object, and wherein receiving the ultrasound waves comprises receiving the waves at the transducer fixed to the plurality of background units.

30. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic; and wherein determining the characteristic comprises determining a Doppler shift of the waves.

31. A method for calibrating an object tracking system, the system comprising a plurality of background units, each unit including an ultrasound transducer for ultrasonic sensing of the position of the object, said method comprising:

placing at least three of the background units in respective locations having known position coordinates in a surveillance area;

placing additional background units in other locations in the surveillance area;

determining position coordinates of a first one of the additional units by transmitting ultrasound waves between the first additional unit and the at least three units having the known position coordinates; and determining position coordinates of a second additional unit by transmitting ultrasound waves between the second additional unit and the first additional unit.

32. The method of claim 31, wherein placing the additional background units comprises placing the second additional unit in a position that is inaccessible for transmission of ultrasound waves between the second unit and at least one of the at least three background units having the known position coordinates.

33. The method of claim 31, wherein determining the position coordinates of the first and second additional units comprises measuring times of flight of ultrasound waves transmitted or received by the units.

34. The method of claim 31, wherein determining the position coordinates of the first and second additional units comprises communicating with at least some of the background units via a wireless link, so as to receive position-related data therefrom.

35. The method of claim 31, and comprising determining position coordinates of the first and second additional units a second time, wherein the coordinates of the second additional unit are determined the second time with respect to the at least three units having the known position coordinates before determining the position coordinates of the first additional unit, and averaging the determined position coordinates to determine corrected position coordinates.

36. A system for tracking an object in a detection area, comprising:

at least one first ultrasound transducer, fixed to the object;

a plurality of background units, each unit comprising a respective second ultrasound transducer;

a central unit, in wireless communication with at least either the first transducer or some of the background units, so as to receive information regarding transmission of ultrasound waves between the first and second ultrasound transducers and to determine coordinates of the object based on the information; and comprising wireless receivers coupled to the first and second ultrasound transducers, which receive a trigger signal to initiate the transmission of ultrasound waves between the transducers.

37. The system of claim 36, wherein the information comprises time-of-flight data.

38. The system of claim 36, wherein the information comprises data regarding a Doppler shift of the waves.

39. The system of claim 36, wherein the transducers transmit a plurality of ultrasound waves of distinct frequencies.

40. The system of claim 36, and comprising wireless transmitters coupled to the first and second transducers, which transmit an acknowledgment signal responsive to the trigger signal.

41. The system of claim 36, wherein the central unit transmits the trigger signal.

42. The system of claim 36, wherein the at least one first ultrasound transducer transmits the ultrasound waves, and the second transducers receive the waves.

43. The system of claim 42, wherein the at least one first transducer comprises a plurality of ultrasound transducers, each of which transmits waves having a characteristic which identifies their respective transmitting transducer.

44. The system of claim 43, wherein the characteristic comprises a unique frequency.

45. The system of claim 44, wherein the background units comprise signal processing circuitry, which analyzes the frequencies of the waves and determines their respective times-of-flight.

46. The system of claim 45, wherein the signal processing circuitry comprises a plurality of frequency distinct filters.

47. The system of claim 45, wherein the signal processing circuitry comprises an FFT processor.

48. The system of claim 42, wherein the background units open a time window of a predetermined duration for receiving the ultrasound waves, responsive to the trigger signal.

49. The system of claim 48, wherein the product of the duration of the time window and the speed of sound is substantially less than the extent of the detection area.

50. The system of claim 36, wherein the wireless communication comprises RF communication.

51. A method of tracking an object within a surveillance area having a predetermined linear extent, comprising:

fixing one or more ultrasound transducers to the object;

placing a plurality of background units at known positions in the area, each unit comprising an ultrasound transducer;

transmitting one or more ultrasound waves between the object and the plurality of background units;

receiving those of the ultrasound waves that propagate between the object and the background units within a time window of a duration such that the product of the duration and the speed of sound is substantially less than the linear extent of the detection area;

determining a characteristic of the received ultrasound waves;

calculating coordinates of the object responsive to the characteristic;

wherein calculating the coordinates of the object comprises transmitting the determined characteristic to a control unit over a wireless link; and comprising identifying a background unit from which the control unit has not received the characteristic and requesting re-transmission of the characteristic via another background unit in a vicinity of the identified background unit.

* * * * *